(12) United States Patent
Zeng

(10) Patent No.: US 7,860,333 B2
(45) Date of Patent: Dec. 28, 2010

(54) SYSTEMS AND METHODS FOR DEBLURRING DATA CORRUPTED BY SHIFT VARIANT BLURRING

(75) Inventor: Gengsheng Lawrence Zeng, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 1024 days.

(21) Appl. No.: 11/621,555

(22) Filed: Jan. 9, 2007

(65) Prior Publication Data

US 2008/0166063 A1 Jul. 10, 2008

(51) Int. Cl.
G06K 9/40 (2006.01)
(52) U.S. Cl. .................................. 382/260; 382/275
(58) Field of Classification Search ................ 382/128, 382/205, 254, 255, 260, 275, 280, 284, 285, 382/312; 358/3.26
See application file for complete search history.

(56) References Cited

U.S. PATENT DOCUMENTS

| 5,453,844 | A | | 9/1995 | George et al. | |
|---|---|---|---|---|---|
| 5,550,935 | A | * | 8/1996 | Erdem et al. ................ | 382/260 |
| 5,627,918 | A | * | 5/1997 | Carasso ...................... | 382/254 |
| 6,154,574 | A | | 11/2000 | Paik et al. | |
| 6,959,117 | B2 | | 10/2005 | Ratner et al. | |
| 7,289,247 | B2 | * | 10/2007 | Keshet ....................... | 358/3.26 |
| 7,379,612 | B2 | * | 5/2008 | Milanfar et al. ............. | 382/254 |
| 7,437,012 | B2 | * | 10/2008 | Carasso ...................... | 382/255 |
| 7,558,709 | B2 | * | 7/2009 | Subbarao ....................... | 703/2 |
| 7,616,842 | B2 | * | 11/2009 | Robinson ..................... | 382/312 |
| 7,639,889 | B2 | * | 12/2009 | Steinberg et al. ............ | 382/255 |
| 7,689,017 | B2 | * | 3/2010 | Karl et al. ................... | 382/128 |
| 2003/0002746 | A1 | | 1/2003 | Kusaka | |
| 2005/0047672 | A1 | | 3/2005 | Ben-Ezra et al. | |
| 2006/0110147 | A1 | | 5/2006 | Tomita et al. | |
| 2006/0119710 | A1 | | 6/2006 | Ben-Ezra et al. | |
| 2006/0125938 | A1 | | 6/2006 | Ben-Ezra et al. | |

FOREIGN PATENT DOCUMENTS

WO  WO 2005/031645 A1  4/2005

OTHER PUBLICATIONS

Bilgen et al.,Restoration Of Noisy Images Blurred By A Random Point Spread Function, IEEE International Symposium on Circuits and Systems, May 1-3, 1990, p. 759-762, vol. 1.
Ward, Restoration of Differently Blurred Versions of An Image With Measurement Errors in the PSF's, IEEE Transactions on Image Processing, Jul. 1993, p. 369-381, vol. 2, No. 3.

* cited by examiner

Primary Examiner—Kanji Patel
(74) Attorney, Agent, or Firm—McDermott Will & Emery LLP

(57) ABSTRACT

The present invention provides methods, systems and machine readable medium including machine readable code for deblurring data corrupted by shift variant blurring. A first version of data having shift variant blurring characterized by a first shift variant point spread function is provided. A target shift invariant point spread function is selected. A second shift variant point spread function is derived wherein a combination of the first and second shift variant point spread functions generates the target shift invariant point spread function. The second shift variant point spread function is applied to the first version of the data thereby generating a second version of the data having shift invariant blurring characterized by the target shift invariant point spread function. A linear shift invariant filter is applied to the second version of the data thereby generating a deblurred version of the data.

29 Claims, 5 Drawing Sheets

SYSTEMS AND METHODS FOR DEBLURRING DATA CORRUPTED BY SHIFT VARIANT BLURRING

GOVERNMENTAL INTERESTS

This invention was made with government support under Grant numbers EB001489 and EB003298 awarded by National Institutes of Health. The United States government has certain rights to this invention.

FIELD OF THE INVENTION

The invention generally relates to data processing and more particularly to systems and methods for deblurring data corrupted by shift variant blurring.

BACKGROUND OF THE INVENTION

Imaging devices are routinely used in the medical industry. Examples of such imaging devices include, but are not limited to, Positron Emission Tomography (PET) imaging devices and Single Photon Emission Computed Tomography (SPECT) imaging devices. The imaging devices capture two dimensional projection images of a target or a patient. The two dimensional projection images are reconstructed into a three dimensional volumetric image of the target or the patient. The reconstructed images are often corrupted by uniform attenuation, non-uniform attenuation, and shift variant blurring.

One prior art method for compensating for the shift variant blurring involves the use of a frequency-distance principle (FDP) algorithm. The FDP algorithm is a pre-processing algorithm. In other words, the FDP algorithm attempts to compensate for shift variant blurring in the two dimensional projection images of the target prior to using the two dimensional projection images to reconstruct the three dimensional image of the target. The FDP algorithm makes an assumption that there is no uniform or non-uniform attenuation present in the two dimensional projection images generated by the imaging devices. This assumption often results in the amplification of noise and the introduction of artifacts in the reconstructed three dimensional image of the target.

Another prior art method for compensating for shift variant blurring involves the use of an intrinsic iterative reconstruction algorithm. The intrinsic iterative reconstruction algorithm is implemented during the reconstruction of the two dimensional projection images of the target into a three dimensional image of the target. While the intrinsic iterative reconstruction algorithm is effective at compensating for shift variant blurring, the implementation of the intrinsic iterative reconstruction algorithm can take hours or even days. Such long processing times to obtain a three dimensional image of a target can lead to delays in diagnosis and treatment of a patient's medical condition.

Another prior art method involves the use of shift invariant filters to attempt to compensate for shift variant blurring. Shift invariant filters are typically not very effective at filtering shift variant blurring.

Thus what is needed is a system and method for deblurring data corrupted by shift variant blurring to overcome one or more of the challenges and/or obstacles described above.

SUMMARY OF THE INVENTION

One aspect of the invention provides a method of deblurring data corrupted by shift variant blurring. The method includes providing a first version of data having shift variant blurring characterized by a first shift variant point spread function, selecting a target shift invariant point spread function, deriving a second shift variant point spread function wherein a combination of the first and second shift variant point spread functions generates the target shift invariant point spread function, applying the second shift variant point spread function to the first version of the data thereby generating a second version of the data having shift invariant blurring characterized by the target shift invariant point spread function, and applying a linear shift invariant filter to the second version of the data thereby generating a deblurred version of the data.

Another aspect of the invention provides a machine readable medium for storing a machine executable program for deblurring data corrupted by shift variant blurring. The machine readable medium includes machine readable code for providing a first version of data having shift variant blurring characterized by a first shift variant point spread function, machine readable code for selecting a target shift invariant point spread function, machine readable code for deriving a second shift variant point spread function wherein a combination of the first and second shift variant point spread functions generates the target shift invariant point spread function, machine readable code for applying the second shift variant point spread function to the first version of the data thereby generating a second version of the data having shift invariant blurring characterized by the target shift invariant point spread function, and machine readable code for applying a linear shift invariant filter to the second version of the data thereby generating a deblurred version of the data.

Another aspect of the invention provides a method for deblurring data corrupted by shift variant blurring. The method includes providing a first version of data having shift variant blurring, blurring the first version of the data further using a shift variant blurring kernel thereby generating a second version of data having shift invariant blurring, and applying a linear shift invariant filter to the second version of the data thereby generating a deblurred version of the data.

The foregoing and other features and advantages of the invention will become further apparent from the following detailed description of the presently preferred embodiments, read in conjunction with the accompanying drawings. The detailed description and drawings are merely illustrative of the invention rather than limiting the scope of the invention being defined by the appended claims and equivalents thereof.

BRIEF DESCRIPTION OF THE DRAWINGS

The present invention is illustrated by way of example and not limited in scope to the accompanying figures, in which like reference numerals indicate similar elements, and in which.

DETAILED DESCRIPTION OF THE PREFERRED EMBODIMENTS

Figure 1:
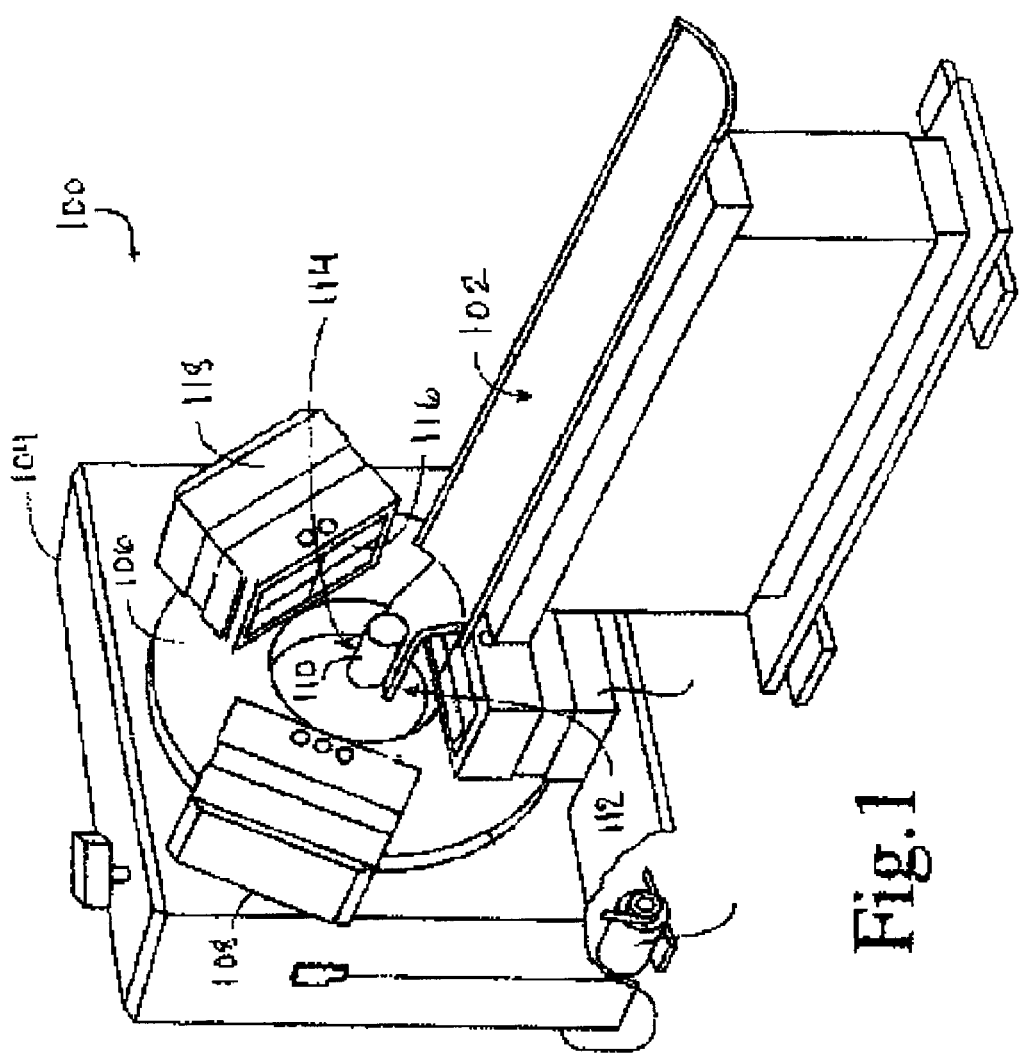
FIG. 1 is a perspective view of one example of an embodiment of a nuclear imaging assembly in accordance with the principles of the present invention.

Referring to FIG. 1 a perspective view of one example of an embodiment of a nuclear imaging assembly 100 in accordance with the principles of the present invention is shown. While the illustrated example of a nuclear imaging assembly 100 is a SPECT nuclear imaging assembly, the use of other types of nuclear imaging assemblies are also considered to be within the scope of the invention. The nuclear imaging assembly 100 generally includes a subject support structure 102, a base gantry 104, a rotatable gantry 106, and one or more gamma ray imaging devices 108. A subject 110, such as for example a patient, is typically injected with one or more radiopharmaceuticals or radioisotopes. The injected radiopharmaceuticals are absorbed by and localize within a target organ, or target in the subject 110. The accumulated radiopharmaceuticals emit energy in the form of gamma rays or photons that illuminate the target. The nuclear imaging assembly 100 creates images of the distribution of the accumulated radioactive pharmaceuticals within the subject target.

The subject support structure 102 supports the subject 110 to be imaged. Examples of subjects 110 include, but are not limited to, patients, animals, portions of animals, and phantoms. The rotatable gantry 106 is mounted on the base gantry 104 and defines a subject receiving aperture 112 with a subject imaging region 114 within the subject receiving aperture 112. One or more gamma ray imaging devices 108 are adjustably mounted to the rotatable gantry 106. In one embodiment, the gamma ray imaging devices 108 are positioned at regular intervals around the subject imaging region 114. For example, a total of three gamma ray imaging devices 108 may be positioned on the rotatable gantry 106 at 120° intervals around the subject imaging region 114. In another embodiment, the gamma ray imaging devices 108 may be circumferentially adjustable to selectively vary their relative spacing with respect to each other on the rotatable gantry 106. In one embodiment, separate translation devices such as motors and drive assemblies (not shown) independently translate the gamma ray imaging devices 108 laterally in directions tangential to the subject imaging region 114 along linear tracks or other appropriate guide structures. In another embodiment, the gamma ray imaging devices 108 are also independently movable in a radial direction with respect to the subject imaging region 114. In yet another embodiment, the gamma ray imaging devices 108 can be selectively canted or tilted with respect to the radial lines from the center of the subject imaging region 114. A motor and drive system (not shown) is employed to control the movement of the gamma ray imaging devices 108. In one embodiment, each gamma ray imaging device 108 can be positioned and controlled individually. In another embodiment, the gamma ray imaging devices 108 can be positioned and controlled together as a unit.

In one embodiment, the base gantry 104 can be advanced towards and/or retracted from the subject support structure 102 so as to appropriately position the subject 110 within the subject imaging region 114 to obtain desired images of the target. In another embodiment, the subject support structure 102 can be advanced towards and/or retracted from the base gantry 104 to achieve the desired positioning of the subject 110 within the subject imaging region 114. In yet another embodiment, the subject support structure 102 can be raised or lowered to appropriately position the subject 110 within the subject imaging region 114.

Each of the one or more gamma ray imaging devices 108 includes a collimator 116 and a detector 118. Each detector 118 typically includes a scintillation crystal which produces a flash or scintillation of light each time it is struck by radiation emanating from the radioactive dye in the subject 110. An array of photomultiplier tubes and associated circuitry produces an output signal which is indicative of the (x, y) position of each scintillation on the crystal.

In operation, the subject 110 is placed on the subject support structure 102 and the subject support structure 102 is appropriately positioned within the subject receiving aperture 112 such that the target is positioned within the subject imaging region 114. The one or more gamma ray imaging devices 108 are appropriately positioned with respect to the target to be imaged. The one or more gamma ray detectors 108 are rotated or indexed in a generally circular orbit about the subject imaging region 114. The direction of the rotation of the gamma ray imaging devices 108 defines the axis of rotation. The one or more gamma ray imaging devices 108 detect the radiation emitted by the target from a plurality of different directions and capture multiple two dimensional images, where each image provides a different angular view of the target. The collected two dimensional images are used to compute or reconstruct three dimensional volumetric representations of the target.

In another embodiment of the invention, one or more gamma ray imaging devices 108 are mounted onto a base gantry. The subject support structure includes a rotatable subject support portion. The one or more gamma ray imaging devices 108 are maintained in stationary positions with respect to the subject imaging region. In operation, the subject is appropriately positioned on the rotatable subject support portion and the rotatable subject support portion is appropriately positioned within the subject imaging region. The rotatable subject support portion is rotated about an axis of rotation, where the axis of rotation is generally parallel to the planar faces of the one or more gamma ray imaging devices 108. The one or more gamma ray imaging devices 108 detect the radiation emitted by the target from a plurality of different directions and capture multiple two dimensional images, where each image provides a different angular view of the target. The collected two dimensional images are used to compute or reconstruct three dimensional volumetric representations of the target.

Figure 2:
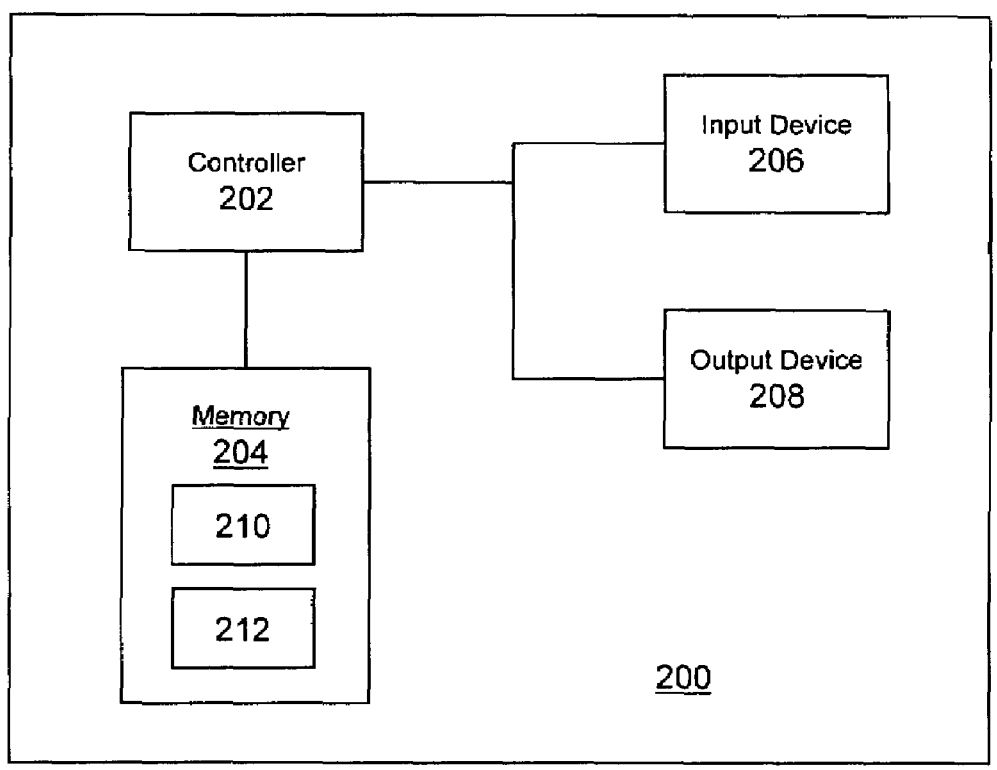
FIG. 2 is a block diagram of a system that may be used to implement one embodiment of a method of deblurring an image in accordance with the principles of the present invention.

Referring to FIG. 2, a block diagram of a system that may be used to implement one embodiment of a method of deblurring an image in accordance with the principles of the present invention is shown. Examples of devices that may include the system 200 include, but are not limited to, a computer. In one embodiment, the system 200 is integrated as a component of the nuclear imaging assembly 100. In one embodiment, the system 200 generally includes a controller 202 communicatively coupled to a memory 204, an input device 206, and an output device 208. The controller 202 generally retrieves and executes machine readable instructions or software programs that are stored in the memory 204.

The memory 204 generally includes an operating system module 210 and a data deblurring module 212. The memory 204 may include additional application modules that may facilitate the operation of the system 200 and image deblurring functions. The memory 204 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices.

The controller 202 is communicatively coupled to one or more input devices 206 and one or more output devices 208. Examples of input devices 206 include, but are not limited to, a scanner, a memory storage device reader, a keyboard, and a mouse. In one embodiment, one or more input/output interfaces are provided to enable data transfer between the controller 202 and other devices, such as for example, a nuclear imaging assembly 100 and another computer. In one embodiment, an input/output interface is provided to a network that enables the exchange of data between the nuclear imaging assembly 100 and the system 200. Examples of output devices 208 include, but are not limited to, a display screen, a computer storage device, and a printer. Examples of computer storage devices include hard disk drives, compact disc drives, digital versatile disc drives, and flash memory devices.

Figure 3:
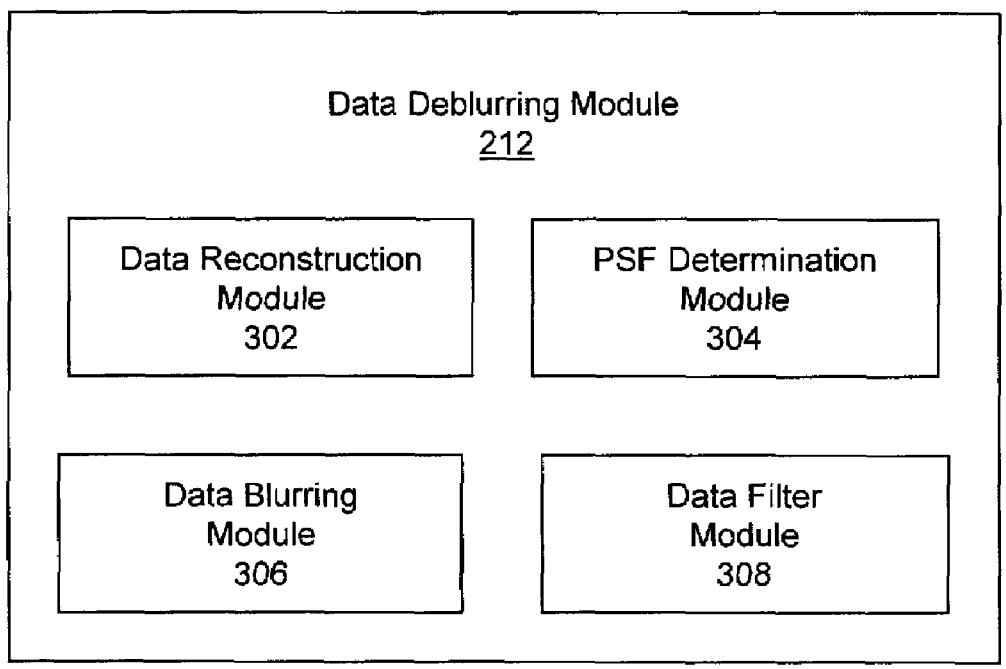
FIG. 3 is a block diagram of one embodiment of an image deblurring module in accordance with the principles of the present invention.
Figure 4A:
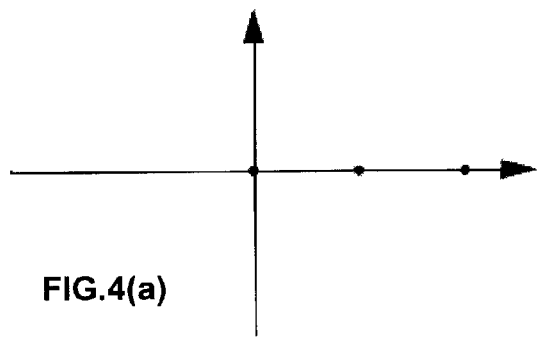
FIGS. 4(a)-(d) is an illustrative example of an implementation of one embodiment of a rotational convolution method in accordance with the principles of the present invention.
Figure 4B:
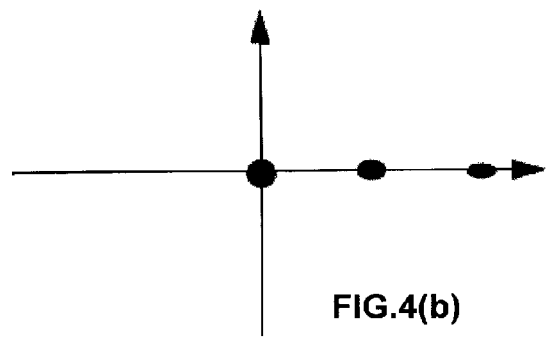
Figure 4C:
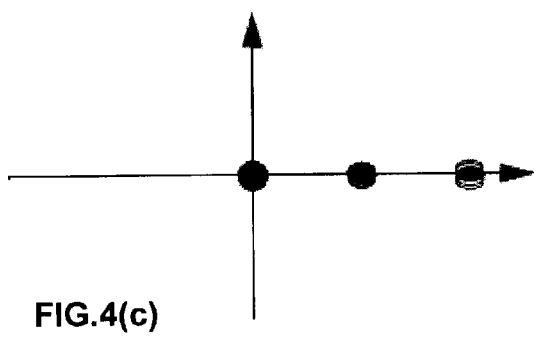
Figure 4D:
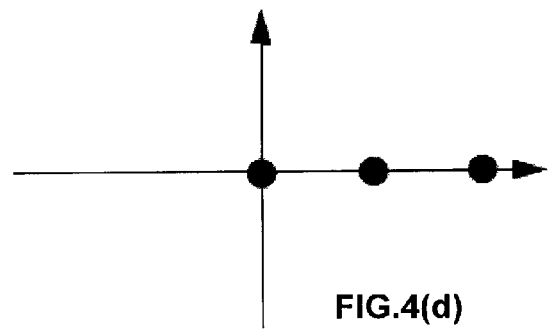

Referring to FIG. 3 a block diagram of one embodiment of a data deblurring module 212 in accordance with the principles of the present invention is shown. The two dimensional images of the target collected by the one or more gamma ray imaging devices 108 are typically corrupted by target specific non-uniform attenuation, collimator specific blurring effect, and target specific scattering effect. The target specific scattering is also known as the Compton scatter effect. One embodiment of the data deblurring module 212 generally includes a data reconstruction module 302, a point spread function (PSF) determination module 304, a data blurring module 306, and a data filter module 308. The data deblurring module 212 generally receives the corrupted version of the two dimensional images of the target collected by the one or more gamma ray imaging devices 108 for processing and generates a deblurred version of a three dimensional image of the target.

Another embodiment of the data deblurring module 212 generally includes a PSF determination module 304, a data blurring module 306, and a data filter module 308. The data deblurring module 212 generally receives a three dimensional image of the target reconstructed from the corrupted two dimensional images for processing. The reconstructed three dimensional image is typically corrupted by shift variant blurring. The data deblurring module 212 processes the received reconstructed three dimensional image and generates a deblurred version of the reconstructed three dimensional image of the target.

In one embodiment, PSF determination module 304, the data blurring module 306, the data filter module 308, and the optional the data reconstruction module 302 are all included within a single device. In one embodiment, the PSF determination module 304, the data blurring module 306, the data filter module 308, and the optional data reconstruction module 302 are distributed over one or more communicatively coupled devices.

As mentioned previously, the two dimensional images of the target collected by the one or more gamma ray imaging devices 108 are typically corrupted by target specific non-uniform attenuation, collimator specific blurring effect, and target specific scattering effect. The two dimensional images of the target may also be corrupted by uniform attenuation.

The data reconstruction module 302 generally receives the two dimensional images collected by the one or more gamma ray imaging devices 108 and generates a reconstructed three dimensional image of the target with non-uniform attenuation compensation.

In one embodiment, a transmission scan of the target is provided to the data reconstruction module 302. The transmission scan of the target is typically acquired using, for example, x-rays or gamma rays. The data reconstruction module 302 uses the transmission scan of the target to generate an attenuation map of the target. The attenuation map is an image of the linear attenuation coefficients associated with a specific target for a specified photon energy level. In one embodiment, an attenuation map of the target is provided directly to the data reconstruction module 302. In one embodiment, a magnetic resonance imaging (MRI) system is used to generate an attenuation map of the target. It should be noted that while the use of a number of different techniques for generating an attenuation map of the target have been described, the use of alternative techniques for generating an attenuation map of the target that may be apparent to one of ordinary skill in the art are also considered to be within the scope of the invention.

One embodiment of the data reconstruction module 302 employs a filtered backprojection (FBP) reconstruction algorithm and uses the two dimensional images of the target and the attenuation map of the target to generate a reconstructed three dimensional image of the target that has been compensated for the non-uniform attenuation. One embodiment of the data reconstruction module 302 employs a filtered backprojection (FBP) reconstruction algorithm to generate a reconstructed three dimensional image of the target that has been compensated for the uniform attenuation. In one embodiment, the data reconstruction module 302 uses Novikov's FBP algorithm to generate the reconstructed three dimensional image of the target with non-uniform attenuation compensation. In one embodiment, the data reconstruction module 302 uses Novikov's FBP algorithm to generate the reconstructed three dimensional image of the target with uniform attenuation compensation. One embodiment of the data reconstruction module 302 employs an iterative reconstruction algorithm and uses the two dimensional images of the target and the attenuation map of the target to generate a reconstructed three dimensional image of the target that has been compensated for the non-uniform attenuation. One embodiment of the data reconstruction module 302 employs an iterative reconstruction algorithm to generate a reconstructed three dimensional image of the target that has been compensated for the uniform attenuation. It should be noted that while the use of techniques for compensating non-uniform and/or uniform attenuation in the reconstruction of a three dimensional image has been described, the use of alternative techniques for compensating non-uniform and/or uniform attenuation that may be known to one of ordinary skill in the art may be used without departing from the spirit of the invention.

While the reconstructed three dimensional image generated by the data reconstruction module 302 has been compensated for the non-uniform attenuation, the reconstructed three dimensional image remains corrupted by the collimator specific blurring effect, and the Compton scatter effect. The combined effects of the collimator specific blurring and the Compton scatter effect results in the presence of shift variant or non-stationary blurring in the reconstructed three dimensional image. The shift variant blurring can be characterized using a shift variant position spread function (PSF) in the image domain.

In one embodiment, the PSF determination module 304 receives the reconstructed three dimensional image generated by the data reconstruction module 302 and generates a shift variant PSF characterizing the shift variant blurring present in the reconstructed three dimensional image in the image domain. In one embodiment, the PSF determination module 304 generates a shift variant PSF characterizing the shift variant blurring attributable to the combination of the collimator specific blurring and the Compton scatter effect present in the reconstructed three dimensional image in the image domain. In one embodiment, the PSF determination module 304 generates a shift variant PSF characterizing the shift variant blurring attributable to the collimator blurring effect present in the reconstructed three dimensional image in the image domain. In one embodiment, the PSF determination module 304 generates a shift variant PSF characterizing the shift variant blurring attributable to the Compton scatter effect present in the reconstructed three dimensional image in the image domain.

In one embodiment, the PSF determination module 304 determines a first shift variant PSF or a collimator specific PSF characterizing collimator specific blurring in the reconstructed three dimensional image. The first shift variant PSF of the reconstructed three dimensional image is in the image domain. In one embodiment, the PSF determination module 304 determines the first shift variant PSF based on collimator specifications provided by the collimator manufacturer. In one embodiment, the PSF determination module 304 derives the first shift variant PSF based on an analysis of collimator generated projections of a point source and/or line source. The PSF determination module 304 determines a shift variant PSF for each of the two dimensional projections generated by the collimator and uses the shift variant PSFs for the two dimensional projections to derive the first shift variant PSF of the reconstructed three dimensional image in the image domain. In one embodiment, The PSF determination module 304 employs Novikov's FBP algorithm to derive the first shift variant PSF of reconstructed three dimensional image in the image domain from the detector PSF where the detector is associated with the collimator. While a number of different techniques have been described for determining the first shift variant PSF associated with collimator specific blurring for a reconstructed three dimensional image in the image domain, alternative techniques for determining the first shift variant PSF of the reconstructed three dimensional image in the image domain known to one of ordinary skill in the art may be used without departing from the spirit of the invention.

In one embodiment, the PSF determination module 304 determines a second shift variant PSF or a target specific scattering PSF characterizing the Compton scatter effect on the reconstructed three dimensional image. The second shift variant PSF of the reconstructed three dimensional image is in the image domain. In one embodiment, the PSF determination module 304 determines the second shift variant PSF based on an attenuation map of the target.

In one embodiment, an attenuation map of the target is provided directly to the PSF determination module 304. In one embodiment, the attenuation map is provided from the data reconstruction module 302 to the PSF determination module 304. In one embodiment, a transmission scan of the target is provided to the PSF determination module 304. The PSF determination module 304 uses the transmission scan to generate an attenuation map of the target. In one embodiment, a magnetic resonance imaging (MRI) system is used to generate an attenuation map of the target. It should be noted that while the use of a number of different techniques for generating an attenuation map of the target have been described, the use of alternative techniques for generating an attenuation map and determining the scatter effect of the target that may be apparent to one of ordinary skill in the art are also considered to be within the scope of the invention.

While one technique has been described for determining the second shift variant PSF associated with the Compton scatter effect for a reconstructed three dimensional image in the image domain, alternative techniques for determining the second shift variant PSF of the reconstructed three dimensional image in the image domain known to one of ordinary skill in the art may be used without departing from the spirit of the invention.

In one embodiment, the PSF determination module 304 uses the first shift variant PSF associated with collimator specific blurring and the second shift variant PSF associated with the Compton scatter effect to derive the shift variant PSF characterizing the shift variant blurring present in the reconstructed three dimensional image in the image domain. While one manner of determining a shift variant PSF for the reconstructed image in the image domain characterizing the shift variant blurring attributable to the combination of the collimator specific blurring and the Compton scatter effect present in the reconstructed three dimensional image has been described, the use of alternative techniques for determining the shift variant PSF for the reconstructed image in the image domain are also considered to be within the scope of the invention.

For illustrative purposes, the following definitions will be used. The function g(x, y, z) will be used to represent the reconstructed three dimensional image generated by the data reconstruction module 302. The function h(x, y, z; $x_0$, $y_0$, $z_0$) will be used to represent the shift variant PSF representative of the shift variant blurring present in the reconstructed three dimensional image generated by the PSF generation module 304. The function f(x, y, z) will be used to represent an unblurred or true version of the reconstructed three dimensional image.

The relationship between the reconstructed three dimensional image g(x, y, z), the shift variant PSF h(x, y, z; $x_0$, $y_0$, $z_0$), and the unblurred version of the reconstructed three dimensional image f(x, y, z) at a point ($x_0$, $y_0$, $z_0$) of the three dimensional image of the target can be mathematically modeled in the spatial domain as indicated in Equation (1) below:

$$g(x_0, y_0, z_0) = \sum_{x,y,z} f(x, y, z) h(x - x_0 y - y_0, z - z_0; x_0, y_0, z_0) \quad \text{Equation (1)}$$

The data blurring module 306 generally receives the reconstructed three dimensional image g(x, y, z) and the shift variant PSF h(x, y, z, $x_0$, $y_0$, $z_0$) characterizing the shift variant blurring present in the reconstructed three dimensional image g(x, y, z) and generates a blurrier version of the reconstructed three dimensional image having a target shift invariant or stationary PSF. One embodiment of the data blurring module 306 selects a target shift invariant PSF. In one embodiment, the selected target shift invariant PSF is the PSF of the blurriest section of the reconstructed three dimensional image g(x, y, z). In one embodiment, the selected target shift invariant PSF is a shift invariant PSF that exceeds the PSF of the blurriest portion of the reconstructed three dimensional image. In one embodiment, the selected target PSF is the PSF of a relatively blurrier section of the reconstructed three dimensional image. The data blurring module 306 derives a blurring kernel. The derived blurring kernel has a shift variant PSF, such that the combination of the shift variant PSF h(x, y, z; $x_0$, $y_0$, $z_0$) of the reconstructed three dimensional image and the shift variant PSF of the blurring kernel generates the target shift invariant PSF.

For illustrative purposes the function $h_0(x, y, z)$ will be used to represent the selected target shift invariant PSF, the function $k(x, y, z; x_0, y_0, z_0)$ will be used to represent the blurring kernel defined by the shift variant PSF. The relationship between the shift variant PSF $h(x, y, z; x_0, y_0, z_0)$ of the reconstructed three dimensional image, the selected target shift invariant PSF $h_0(x, y, z)$, and the blurring kernel defined by the shift variant PSF $k(x, y, z; x_0, y_0, z_0)$ can be mathematically modeled in the spatial domain as indicated in Equation (2) below:

$$h_0(x,y,z) = h(x,y,z;x_0,y_0,z_0) * k(x,y,z;x_0,y_0,z_0) \quad \text{Equation (2)}$$

where the symbol "*" represents a three dimensional convolution operator.

For illustrative purposes, $H(u, v, w; x_0, y_0, z_0)$ will be used to represent the Fourier transform of $h(x, y, z; x_0, y_0, z_0)$, $H_0(u, v, w)$ will be used to represent the Fourier transform of $h_0(x, y, z)$, and $K(u, v, w; x_0, y_0, z_0)$ will be used to represent the Fourier transform of $k(x, y, z; x_0, y_0, z_0)$. The parameters u, v, and w represent frequencies along the x, y, and z axes, respectively. Based on the relationship between the functions $h_0(x, y, z)$, $h(x, y, z; x_0, y_0, z_0)$, and $k(x, y, z; x_0, y_0, z_0)$ defined in the spatial domain in Equation (2), the relationship between $H(u, v, w; x_0, y_0, z_0)$, $H_0(u, v, w)$, and $K(u, v, w; x_0, y_0, z_0)$ can be mathematically modeled in the frequency domain as indicated in Equation (3) below:

$$H_0(u,v,w) = H(u,v,w;x_0,y_0,z_0) \times K(u,v,w;x_0,y_0,z_0) \quad \text{Equation (3)}$$

Dividing both sides of the Equation (3) by $H(u, v, w; x_0, y_0, z_0)$, generates the relationship indicated in Equation (4) below:

$$K(u,v,w,x_0,y_0,z_0) = H_0(u,v,w)/H(u,v,w,x_0,y_0,z_0) \quad \text{Equation (4)}$$

In one embodiment, the data blurring module 306 receives the reconstructed three dimensional image g(x, y, z) and the shift variant PSF h(x, y, z; $x_0$, $y_0$, $z_0$), characterizing the shift variant blurring present in the reconstructed three dimensional image. The data blurring module 306 selects the PSF of the blurriest section of the reconstructed three dimensional image g(x, y, z) as the target shift invariant PSF $h_0(x, y, z)$. The data blurring module 306 determines the Fourier transforms $H_0(u, v, w)$ and H(u, v, w; $x_0$, $y_0$, $z_0$) of the target shift invariant PSF $h_0(x, y, z)$ and the shift variant PSF h(x, y, z; $x_0$, $y_0$, $z_0$), respectively. The data blurring module 306 divides the Fourier transform of the target shift invariant PSF $H_0(u, v, w)$ by the Fourier transform of the shift variant PSF H(u, v, w; $x_0$, $y_0$, $z_0$) of the three dimensional reconstructed image to determine the Fourier transform of the shift variant PSF defining the blurring kernel K(u, v, w; $x_0$, $y_0$, $z_0$). The data blurring module 306 takes the inverse Fourier transform of K(u, v, w; $x_0$, $y_0$, $z_0$) to derive the shift variant PSF function defining the blurring kernel k(x, y, z; $x_0$, $y_0$, $z_0$). The data blurring module 306 applies the derived blurring kernel k(x, y, z, $x_0$, $y_0$, $z_0$) to the reconstructed three dimensional image g(x, y, z) having the shift variant PSF of h(x, y, z; $x_0$, $y_0$, $z_0$) thereby generating the blurrier version of the reconstructed three dimensional image having the target shift invariant PSF $h_0(x, y, z)$.

For illustrative purposes the function q(x, y, z) will be used to represent the blurrier version of the reconstructed three dimensional image having the target shift invariant PSF $h_0(x, y, z)$. The relationship between the blurrier version of the three dimensional reconstructed image q(x, y, z) having the shift invariant PSF $h_0(x, y, z)$, the reconstructed three dimensional image g(x, y, z) having the shift variant PSF h(x, y, z; $x_0$, $y_0$, $z_0$), and the blurring kernel k(x, y, z; $x_0$, $y_0$, $z_0$) at a point ($x_0$, $y_0$, $z_0$) of the reconstructed three dimensional image can be mathematically modeled as indicated in Equation (5) below:

$$q(x_0, y_0, z_0) = \sum_{x,y,z} g(x, y, z) k(x - x_0, y - y_0, z - z_0; x_0, y_0, z_0) \quad \text{Equation (5)}$$

The data blurring module 304 forwards the blurrier version of the reconstructed three dimensional image q(x, y, z) having the target shift invariant PSF $h_0(x, y, z)$ to the data filter module 308 for processing.

One embodiment of the data blurring module 306 derives the shift variant PSF defining the blurring kernel k(x, y, z, $x_0$, $y_0$, $z_0$) based on a relationship between the variances of the target shift invariant PSF $h_0(x, y, z)$, and the shift variant PSF h(x, y, z; $x_0$, $y_0$, $z_0$) characterizing the shift variant blurring present in the reconstructed three dimensional image g(x, y, z), and the PSF defining the blurring kernel k(x, y, z $x_0$, $y_0$, $z_0$). For illustrative purposes, the variances of the PSF functions $h_0(x, y, z)$, h(x, y, z, $x_0$, $y_0$, $z_0$), and k(x, y, z; $x_0$, $y_0$, $z_0$) will be represented as $\sigma_{h_0}^2$, $\sigma_h^2$, and $\sigma_k^2$, respectively. The relationship between the variances $\sigma_{h_0}^2$, $\sigma_h^2$, and $\sigma_k^2$ can be mathematically modeled using a Gaussian model as indicated in Equation (6) below:

$$\sigma_{h_0}^2 = \sigma_h^2 + \sigma_k^2 \quad \text{Equation (6)}$$

Subtracting $\sigma_h^2$ from both sides of the Equation (6) generates the relationship indicated in Equation (7) below:

$$\sigma_k^2 = \sigma_{h_0}^2 - \sigma_h^2 \quad \text{Equation (7)}$$

The data blurring module 306 receives the reconstructed three dimensional image g(x, y, z) and the shift variant PSF h(x, y, z; $x_0$, $y_0$, $z_0$), characterizing the shift variant blurring present in the reconstructed three dimensional image. The data blurring module 306 selects the PSF of the blurriest section of the reconstructed three dimensional image g(x, y, z) as the target shift invariant PSF $h_0(x, y, z)$. The data blurring module 306 derives the variances $\sigma_{h_0}^2$, and $\sigma_h^2$ of the PSF functions $h_0(x, y, z)$ and h(x, y, z, $x_0$, $y_0$, $z_0$), respectively. The data blurring module 306 subtracts the variance of the shift invariant PSF characterizing the shift variant blur present in the reconstructed three dimensional image $\sigma_h^2$ from the variance of the target shift invariant PSF $\sigma_{h_0}^2$ to determine the variance of the shift variant PSF defining the blurring kernel $\sigma_k^2$. The data blurring module 306 uses the variance of the shift variant PSF defining the blurring kernel $\sigma_k^2$ to derive the shift variant PSF defining the blurring kernel k(x, y, z; $x_0$, $y_0$, $z_0$). The data blurring module 306 applies the derived blurring kernel k(x, y, z; $x_0$, $y_0$, $z_0$) to the reconstructed three dimensional image g(x, y, z) having the shift variant PSF of h(x, y, z; $x_0$, $y_0$, $z_0$) thereby generating the blurrier version of the reconstructed three dimensional image q(x, y, z) having the target shift invariant PSF $h_0(x, y, z)$. The data blurring module 304 forwards the blurrier version of the reconstructed three dimensional image q(x, y, z) having the target shift invariant PSF $h_0(x, y, z)$ to the data filter module 308 for processing.

In one embodiment, the data blurring module 306 uses a rotational convolution method to further blur the reconstructed three dimensional image g(x, y, z) to generate the blurrier version of the reconstructed three dimensional image q(x, y, z) having the target shift invariant PSF $h_0(x, y, z)$. The rotational convolution method can be used in instances where the shift variant PSF $h(x, y, z; x_0, y_0, z_0)$ primarily reflects the shift variant collimator specific blurring in the reconstructed three dimensional image and where the two dimensional images of the target were captured using one or more gamma ray imaging devices 108 that were rotated in generally circular orbit around the target.

An illustrative example of the implementation of the rotational convolution method in accordance with the principles of the present invention is described with reference to FIGS. 4(*a*)-(*d*). FIG. 4(*a*) depicts an example of a true unblurred three dimensional image of a target $f(x, y, z)$ consisting of three spheres. The origin of the coordinate system coincides with the axis of rotation of the gamma ray imaging devices 108.

FIG. 4(*b*) illustrates an example of a reconstructed three dimensional image $g(x, y, z)$ of the three spheres having shift invariant blur characterized by a shift invariant PSF $h(x, y, z; x_0, y_0, z_0)$. The width of the shift variant PSF $h(x, y, z; x_0, y_0, z_0)$ is generally stationary along the radial direction (along the x-axis of the coordinate system). The width of the shift variant PSF $h(x, y, z; x_0, y_0, z_0)$ becomes increasingly narrower in the tangential direction (along the y-axis of the coordinate system) as the distance from the axis of rotation (origin of the coordinate system) increases. The reconstructed three dimensional image $g(x, y, z,)$ of the sphere disposed at the origin of the coordinate system represents the blurriest section of the reconstructed three dimensional image and is selected by the data blurring module 308 as the target shift invariant blurring PSF $h_0(x, y, z)$.

Referring to the example illustration in FIG. 4(*c*), the data blurring module 308 incrementally rotates the reconstructed three dimensional image $g(x, y, z,)$ about the origin of the coordinate system through a number of relatively small angles in a clockwise direction and a through a number of relatively small angles in a counter-clockwise direction. The blurriest section of the reconstructed three dimensional image $g(x, y, z)$ define the boundaries of the rotation of the reconstructed three dimensional image $g(x, y, z)$.

The data blurring module 308 determines a weighted sum of the rotated versions of the reconstructed three dimensional image $g(x, y, z,)$ thereby generating a blurrier version of the reconstructed three dimensional image $q(x, y, z,)$ characterized by the target shift invariant blurring PSF $h_0(x, y, z)$. This relationship can be mathematically modeled as indicated in Equation (8) below:

$$q(x_0, y_0, z_0)) = \sum_n a_n g(x_0, y_0, z_0)_{n\Delta} \quad \text{Equation (8)}$$

where $a_n$ represents the weighing factors and $g_\Delta$ represents the incrementally rotated image resulting from each incremental angular rotations of the reconstructed three dimensional version of the image $g(x, y, z,)$. The weighted factors $a_n$ are based on the distance of the point $(x_0, y_0, z_0)$ from the origin of the coordinate system or the axis of rotation. Referring to FIG. 4(*d*), an example of a blurrier version of the reconstructed three dimensional image $q(x, y, z)$ having the target shift invariant PSF of $h_0(x, y, z)$ is shown. Note that the spheres that are further removed from the origin or the axis of rotation are now as blurred as the sphere disposed at the origin of the coordinate system. The data blurring module 304 forwards the blurrier version of the reconstructed three dimensional image $q(x, y, z)$ having the target shift invariant PSF $h_0(x, y, z)$ to the data filter module 308 for processing.

The data filter module 308 generally receives the blurrier version of the reconstructed three dimensional image $q(x, y, z)$ having shift invariant blur characterized by the target shift invariant PSF $h_0(x, y, z)$ and generates a deblurred or true version of the reconstructed three dimensional image $f(x, y, z)$. The data filter module 308 applies a shift invariant linear filter to the blurrier version of the reconstructed three dimensional image $q(x, y, z)$ to compensate for the target shift invariant PSF $h_0(x, y, z)$. In one embodiment, the data filter module 308 applies a non-iterative filter to the blurrier version of the reconstructed three dimensional image $q(x, y, z)$ to generate the deblurred version of the reconstructed three dimensional image $f(x, y, z)$.

In one embodiment, the data filter module 308 de-convolves the blurrier version of the reconstructed three dimensional image $q(x, y, z)$ to compensate for the target shift invariant PSF $h_0(x, y, z)$. In one embodiment, the data filter module 308 implements a convolution procedure in the image domain to deblur the blurrier version of the reconstructed three dimensional image $q(x, y, z)$. In one embodiment, the data filter module 308 implements a multiplication procedure in the frequency domain to deblur the blurrier version of the reconstructed three dimensional image $q(x, y, z)$. In one embodiment, the data filter module 308 employs a fast Fourier domain de-blurring filter to deblur the blurrier version of the reconstructed three dimensional image $q(x, y, z)$. In one embodiment, the data filter module 308 applies an iterative filter to the blurrier version of the reconstructed three dimensional image $q(x, y, z)$ to generate the deblurred version of the reconstructed three dimensional image $f(x, y, z)$. While a number of different types of filters that can be used to compensate for the target shift invariant PSF in the blurrier version of the reconstructed three dimensional image have been described, the use of alternative filters to compensate for shift invariant PSF may be used without departing from the spirit of the invention.

It should be noted that while systems implemented using software or firmware executed by hardware have been described above, those having ordinary skill in the art will readily recognize that the disclosed systems could be implemented exclusively in hardware through the use of one or more custom circuits, such as for example, application-specific integrated circuits (ASICs) or any other suitable combination of hardware and/or software.

Figure 5:
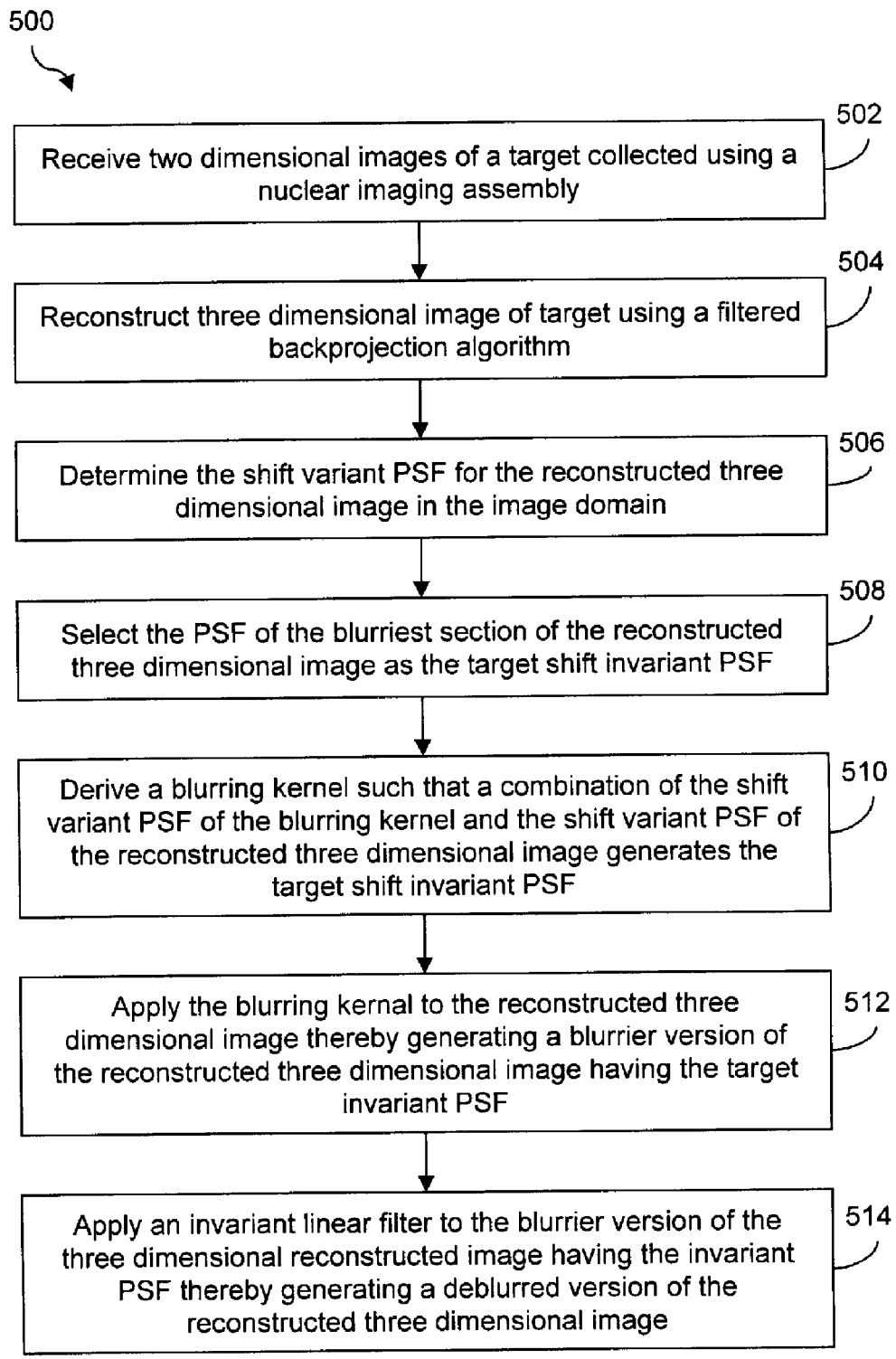
FIG. 5 is a flowchart of one embodiment of a method of deblurring an image corrupted by shift variant blurring in accordance with the principles of the present invention.

Referring to FIG. 5 a flowchart of one embodiment of a method 500 of deblurring an image in accordance with the principles of the present invention is shown. A set of two dimensional images of a target collected by a nuclear imaging assembly 100 is received by the data reconstruction module 302 at step 502. The two dimensional images are also referred to as two dimensional projection images. The received two dimensional images of the target are typically corrupted by target specific non-uniform attenuation, collimator specific blurring effect, and target specific scattering effect. The data reconstruction module 302 reconstructs a three dimensional image of the target from the received two dimensional images of the target using a filtered backprojection algorithm (FBP) at step 504. In another embodiment, the data reconstruction module 302 reconstructs a three dimensional image of the target from the received two dimensional images of the target using an iterative algorithm. The reconstructed three dimensional image generated by the data reconstruction module 302 has been compensated for the non-uniform attenuation. The reconstructed three dimensional image generated by the data reconstruction module 302 has also been compensated for the uniform attenuation. However, the reconstructed three dimensional image remains corrupted by the collimator specific blurring effect, and the target specific scattering effect.

The PSF determination module 304 generates a shift variant PSF characterizing the shift variant blurring present in the reconstructed three dimensional image in the image domain at step 506. The shift variant PSF of the reconstructed three dimensional image characterizes the shift variant blurring attributable to the combination of the collimator specific blurring and the target specific scatter effect present in the reconstructed three dimensional image in the image domain.

The data blurring module 306 selects the PSF of the blurriest portion of the reconstructed three dimensional image as a target shift invariant PSF at step 508. The data blurring module 306 derives a blurring kernel defined by a shift variant PSF, such that the combination of the shift variant PSF of the reconstructed three dimensional image and the shift variant PSF of the blurring kernel generate the target shift invariant PSF at step 510. The data blurring module 308 applies the derived blurring kernel to the reconstructed three dimensional image thereby generating a blurrier version of the reconstructed three dimensional image at step 512. The blurrier version of the reconstructed three dimensional image has shift invariant blurring characterized by the target shift invariant PSF. The data filter module 308 applies a shift invariant linear filter to the blurrier version of the reconstructed three dimensional image having the invariant target PSF thereby generating a deblurred version of the reconstructed three dimensional image at step 514.

It should be noted that while the steps in the method 500 have been described in a particular order, performing one or more of the steps in a different order, or performing a subset of the described steps are also considered to be within the scope of the invention.

Figure 6:
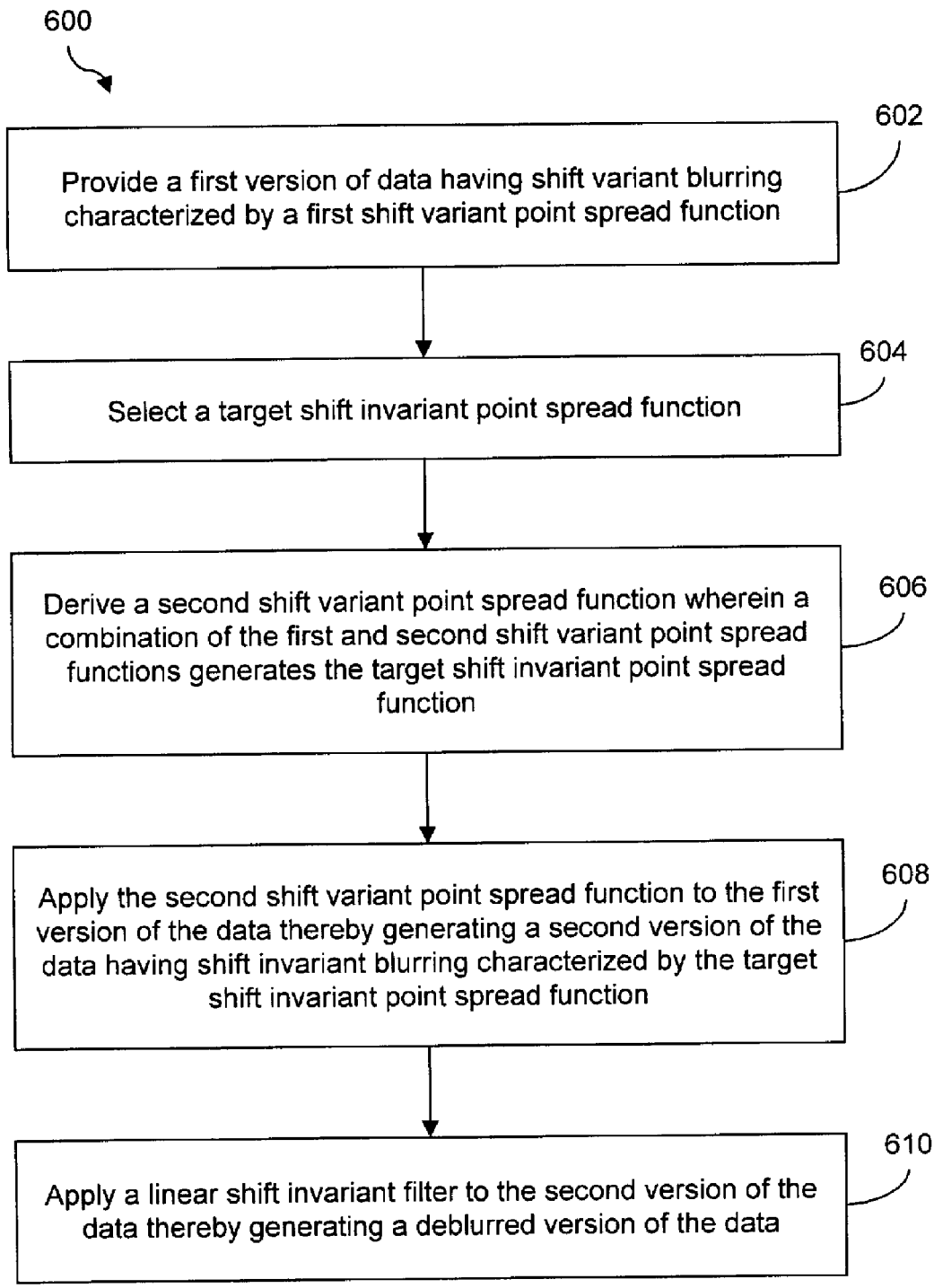
FIG. 6 is a flowchart of one embodiment of a method of deblurring data corrupted by shift variant blurring in accordance with the principles of the present invention.

Referring to FIG. 6, a flowchart of a method 600 of deblurring data corrupted by shift variant blurring in accordance with the principles of the present invention is shown. A first version of data having shift variant blurring characterized by a first shift variant point spread function is provided at step 602. A target shift invariant point spread function is selected at step 604. A second shift variant point spread function is derived at step 606, wherein a combination of the first and second shift variant point spread functions generates the target shift invariant point spread function. The second shift variant point spread function is applied to the first version of the data thereby generating a second version of the data having shift invariant blurring characterized by the target shift invariant point spread function at step 608. A linear shift invariant filter is applied to the second version of the data thereby generating a deblurred version of the data. It should be noted that while the steps in the method 600 have been described in a particular order, performing one or more of the steps in a different order is also considered to be within the scope of the invention.

One embodiment, a machine readable medium stores a machine executable program for deblurring data corrupted by shift variant blurring. The machine readable medium includes machine readable code for providing a first version of data having shift variant blurring characterized by a first shift variant point spread function, machine readable code for selecting a target shift invariant point spread function, machine readable code for deriving a second shift variant point spread function wherein a combination of the first and second shift variant point spread functions generates the target shift invariant point spread function, machine readable code for applying the second shift variant point spread function to the first version of the data thereby generating a second version of the data having shift invariant blurring characterized by the target shift invariant point spread function, and machine readable code for applying a linear shift invariant filter to the second version of the data thereby generating a deblurred version of the data.

One embodiment of a method for deblurring data corrupted by shift variant blurring includes providing a first version of data having shift variant blurring, blurring the first version of the data further using a shift variant blurring kernel thereby generating a second version of data having shift invariant blurring, and applying a linear shift invariant filter to the second version of the data thereby generating a deblurred version of the data.

It should be noted that while systems and methods for deblurring a three dimensional image corrupted by a shift variant PSF has been described, systems and methods for deblurring one dimensional data as well as systems and methods for deblurring two dimensional data, such as for example, two dimensional images are also considered to be within the scope of the invention. For example, in geophysics, the migration of seismic data is often modeled as shift variant convolution. The systems and methods for deblurring data corrupted by shift variant PSF may be used to deblur such data. Two dimensional ultrasound images are an example of two dimensional data that may be corrupted by shift variant blurring. The methods and systems for deblurred data corrupted by shift variant blurring may be used to compensate for the shift variant blurring in such two dimensional data. While examples of specific one and two dimensional data that can be deblurred using the disclosed systems and methods for deblurring data corrupted by shift variant blurring, the processing of other types of one and two dimensional data by the disclosed systems and methods for deblurring data corrupted by shift variant blurring are also considered to be within the scope of the invention.

While the embodiments of the invention disclosed herein are presently considered to be preferred, various changes, and modifications can be made without departing from the spirit and scope of the invention. The scope of the invention is indicated in the appended claims, and all changes that come within the meaning and range of equivalents are intended to be embraced therein.

The invention claimed is:

1. A method of deblurring data corrupted by shift variant blurring, the method comprising:

providing a first version of data having shift variant blurring characterized by a first shift variant point spread function;

selecting a target shift invariant point spread function;

deriving a second shift variant point spread function wherein a combination of the first and second shift variant point spread functions generates the target shift invariant point spread function;

applying the second shift variant point spread function to the first version of the data thereby generating a second version of the data having shift invariant blurring characterized by the target shift invariant point spread function; and applying a linear shift invariant filter to the second version of the data thereby generating a deblurred version of the data.

2. The method of claim 1, wherein providing a first version of data comprises providing a first version of data selected from a group consisting of one dimensional data, two-dimensional data, and three dimensional data.

3. The method of claim 1, further comprising:
providing first and second two dimensional images of a target taken from first and second viewing angles, respectively; and
reconstructing the first version of the data from the first and second two dimensional images of the target, the reconstructed first version of the data being a three dimensional image.

4. The method of claim 3, wherein providing first and second two dimensional images of a target comprises providing first and second two dimensional images of a target as captured by a nuclear imaging assembly.

5. The method of claim 3, wherein reconstructing the first version of the data from the first and second two dimensional images of the target comprises reconstructing the first version of the data from the first and second two dimensional images of the target using a reconstruction algorithm selected from a group consisting of a filtered backprojection (FBP) reconstruction algorithm and an iterative reconstruction algorithm.

6. The method of claim 3, wherein reconstructing the first version of the data from the first and second two dimensional images of the target comprises reconstructing the first version of the data from the first and second two dimensional images of the target using Novikov's filtered backprojection (FBP) reconstruction algorithm.

7. The method of claim 1, wherein the first version of data comprises a three dimensional image, the method further comprising:
determining a collimator specific point spread function characterizing a first component of the shift variant blurring attributable to a collimator specific blurring effect in an image domain;
determining a target specific scattering point spread function characterizing a second component of the shift variant blurring attributable to a target specific scattering effect in an image domain; and
deriving the first variant point spread function based on the collimator specific point spread function and the target specific point spread function.

8. The method of claim 7, wherein determining a collimator specific point spread function in the image domain comprises determining the collimator specific point spread function based on collimator data selected from a group consisting of manufacturer supplied collimator specification data, collimator projection data, and collimator detector point spread function data.

9. The method of claim 7, wherein determining a collimator specific point spread function in the image domain comprises determining a collimator specific point spread function using a reconstruction algorithm selected from a group consisting of a filtered backprojection (FBP) reconstruction algorithm and an iterative reconstruction algorithm.

10. The method of claim 1, wherein selecting a target shift invariant point spread function comprises selecting a target shift invariant point spread function from a group consisting of a point spread function of a blurriest section of the first version of the data, a point spread function that exceeds a point spread function of blurriest section of the first version of the data, and a point spread function of a relatively blurry section of the first version of the data.

11. The method of claim 1, wherein deriving a second shift variant point spread function comprises:
deteimining a Fourier transform of the target shift invariant point spread function;
determining a Fourier transform of the first shift variant point spread function;
generating a Fourier transform of the second shift variant point spread function by dividing the Fourier transform of the target shift invariant point spread function by the Fourier transform of the first shift variant point spread function; and
determining the inverse Fourier transform of the second shift variant point spread function thereby generating the second shift variant point spread function.

12. The method of claim 1, wherein deriving a second shift variant point spread function comprises:
determining a variance of the target shift invariant point spread function;
determining a variance of the first shift variant point spread function;
generating a variance of the second shift variant point spread function by subtracting the variance of the first shift variant pint spread function from the variance of the target shift invariant point spread function; and
deriving the second shift variant point spread function from the variance of the second shift variant point spread function.

13. The method of claim 1, wherein applying the second shift variant point spread function to the first version of the data thereby generating a second version of the data having shift invariant blurring characterized by the target shift invariant point spread function comprises applying the second shift variant point spread function to the first version of the data using a rotational convolution method.

14. The method of claim 1, wherein applying a linear shift invariant filter to the second version of the data thereby generating a deblurred version of the data comprises applying a linear shift invariant filter selected from a group consisting of a non-iterative filter, an iterative filter, a convolution procedure based filter, a frequency domain multiplication procedure based filter, and a fast Fourier domain de-blurring filter.

15. A non-transitory machine readable medium for storing a machine executable program for deblurring data corrupted by shift variant blurring comprising:
machine readable code for providing a first version of data having shift variant blurring characterized by a first shift variant point spread function;
machine readable code for selecting a target shift invariant point spread function;
machine readable code for deriving a second shift variant point spread function wherein a combination of the first and second shift variant point spread functions generates the target shift invariant point spread function;
machine readable code for applying the second shift variant point spread function to the first version of the data thereby generating a second version of the data having shift invariant blurring characterized by the target shift invariant point spread function; and
machine readable code for applying a linear shift invariant filter to the second version of the data thereby generating a deblurred version of the data.

16. The non-transitory machine readable medium of claim 15, wherein the machine readable code for providing a first version of data comprises machine readable code for providing a first version of data selected from a group consisting of one dimensional data, two dimensional data, and three dimensional data.

17. The non-transitory machine readable medium of claim 15, further comprising:
machine readable code for reconstructing the first version of the data from the first and second different angular views of the target, the reconstructed first version of the data being a three dimensional image.

18. The non-transitory machine readable medium of claim 17, wherein the machine readable code for providing first and second different angular views of a target comprises machine readable code for retrieving the first and second different angular views of the target from a nuclear imaging assembly.

19. The non-transitory machine readable medium of claim 17, wherein the machine readable code for reconstructing the first version of the data from the first and second different angular views of the target comprises machine readable code for reconstructing the first version of the data from the first and second different angular views of the target using a filtered backprojection (FBP) reconstruction algorithm.

20. The non-transitory machine readable medium of claim 17, wherein the machine readable code for reconstructing the first version of the data from the first and second different angular views of the target comprises machine readable code for reconstructing the first version of the data from the first and second different angular views of the target using Novikov's filtered backprojection (FBP) reconstruction algorithm.

21. The non-transitory machine readable medium of claim 15, wherein the first version of data comprises a three dimensional image, the machine readable medium further comprising:
    machine readable code for determining a collimator specific point spread function characterizing a first component of the shift variant blurring attributable to a collimator specific blurring effect in an image domain;
    machine readable code for determining a target specific scattering point spread function characterizing a second component of the shift variant blurring attributable to a target specific scattering effect in an image domain; and
    machine readable code for deriving the first variant point spread function based on the collimator specific point spread function and the target specific point spread function.

22. The non-transitory machine readable medium of claim 21, wherein the machine readable code for determining a collimator specific point spread function in the image domain comprises machine readable code for determining the collimator specific point spread function based on collimator data selected from a group consisting of manufacturer supplied collimator specification data, collimator projection data, and collimator detector point spread function data.

23. The non-transitory machine readable medium of claim 21, wherein the machine readable code for determining a collimator specific point spread function in the image domain comprises machine readable code for determining a collimator specific point spread function using Novikov's filtered backprojection (FBP) algorithm.

24. The non-transitory machine readable medium of claim 15, wherein the machine readable code for selecting a target shift invariant point spread function comprises machine readable code for selecting a target shift invariant point spread function from a group consisting of a point spread function of a blurriest section of the first version of the data, a point spread function that exceeds a point spread function of a blurriest section of the first version of the data, and a point spread function of a relatively blurry section of the first version of the data.

25. The non-transitory machine readable medium of claim 15, wherein the machine readable code for deriving a second shift variant point spread function comprises:
    machine readable code for determining a Fourier transform of the target shift invariant point spread function;
    machine readable code for determining Fourier transform of the first shift variant point spread function;
    machine readable code for generating a Fourier transform of the second shift variant point spread function by dividing the Fourier transform of the target shift invariant point spread function by the Fourier transform of the first shift variant point spread function; and
    machine readable code for determining the inverse Fourier transform of the second shift variant point spread function thereby generating the second shift variant point spread function.

26. The non-transitory machine readable medium of claim 15, wherein the machine readable code for deriving a second shift variant point spread function comprises:
    machine readable code for determining a variance of the target shift invariant point spread function;
    machine readable code for determining a variance of the first shift variant point spread function;
    machine readable code for generating a variance of the second shift variant point spread function by subtracting the variance of the first shift variant point spread function from the variance of the target shift invariant point spread function; and
    machine readable code for deriving the second shift variant point spread function from the variance of the second shift variant point spread function.

27. The non-transitory machine readable medium of claim 15, wherein the machine readable code for applying the second shift variant point spread function to the first version of the data thereby generating a second version of the data having shift invariant blurring characterized by the target shift invariant point spread function comprises machine readable code for applying the second shift variant point spread function to the first version of the data using a rotational convolution method.

28. The non-transitory machine readable medium of claim 15, wherein the machine readable code for applying a linear shift invariant filter to the second version of the data thereby generating a deblurred version of the data comprises machine readable code for applying a linear shift invariant filter selected from a group consisting of a non-iterative filter, an iterative filter, a convolution procedure based filter, a frequency domain multiplication procedure based filter, and a fast Fourier domain de-blurring filter.

29. A method of deblurring data corrupted by shift variant blurring, the method comprising:
    providing a first version of data having shift variant blurring;
    blurring the first version of the data further using a shift variant blurring kernel thereby generating a second version of data having shift invariant blurring; and
    applying a linear shift invariant filter to the second version of the data thereby generating a deblurred version of the data.

* * * * *